United States Patent Office 2,721,178
Patented Oct. 18, 1955

2,721,178

POLY-OXYALKYLENE GLYCOL LUBRICANT COMPOSITIONS

Oliver L. Harle, Berkeley, Calif., assignor to California Research Corporation, San Francisco, Calif., a corporation of Delaware No Drawing. Application March 30, 1953,
Serial No. 345,710

11 Claims. (Cl. 252—47.5)

The present invention relates to the preparation of novel and superior lubricating oil compositions. More particularly, the invention has to do with the preparation of polyoxyalkylene glycol lubricating oil compositions having improved stability toward oxidative deterioration.

Polyoxyalkylene glycol materials have hitherto been proposed for use as synthetic lubricants and are rapidly assuming a position of major importance in the lubricant field. These materials are of the type obtained by polymerizing 1,2-alkylene oxides or the corresponding glycols (preferably ethylene oxide or 1,2-propylene oxide) with a suitable reaction initiator such as water, a monohydric alcohol or a glycol, in the presence of catalyst. The resulting polymer materials are polyoxyalkylene glycols having a free hydroxy group at each end of the molecule, or polyoxyalkylene glycols wherein one or both of the terminal hydroxy groups are replaced by alkoxy or acyloxy groups to yield mono- or diethers, mono- or diesters, or ether-esters. Methods for synthesizing these polyoxyalkylene glycols, which comprise the major portion of the lubricant compositions of the present invention, are well known in the art and need not further be described here, reference being made to U. S. Patents Nos. 2,448,664 and 2,457,139, among other patents, for a more complete description of the methods by which these polymeric compounds are prepared.

Although the above-described polyoxyalkylene glycols have certain desirable attributes, they possess a serious drawback of being highly sensitive to oxidative attack. Upon oxidation these polymeric materials depolymerize with consequent loss in viscosity to form undesirable acidic compounds as well as various relatively volatile materials which are rapidly lost from the lubricating system at elevated temperatures. Accordingly, it is an object of this invention to impart oxidative stability to polyoxyalkylene glycols prepared from alkylene oxides or glycols, and particularly from ethylene oxide or 1,2-propylene oxide, or from a mixture of these $C_2$ and $C_3$ oxides. A further object is to prepare novel and superior lubricating oil compositions which are composed in major portion of said polyoxyalkylene glycols and are characterized by a high degree of resistance to oxidative attack.

The invention is predicated on the discovery that polyoxyalkylene glycol materials of the type described above can be made unusually resistant against oxidative attack by incorporating therein a particular combination of additives, one of which is an aromatic diaryl amine or a polyhydroxy aromatic compound and is regarded as the primary inhibitor, while the other is a thiocarbonyl-initiated polyoxyalkylene glycol material, which is designated herein as the auxiliary inhibitor and functions, in a sense, as an activator for the primary inhibitor. The good results obtained by using a combination of these two additives were quite unexpected since the thiocarbonyl-initiated materials have substantially no antioxidant effect on polyoxyalkylene glycol materials when employed alone therein. However, when used conjointly with the aromatic inhibitor, compositions with outstanding resistance against oxidation are obtained.

As indicated above, the primary inhibitor can be an aromatic diaryl amine or a polyhydroxy aromatic compound, or materials from each of said classes can be employed together in a given composition, if desired. Preferably, however, the primary inhibitor comprises an aromatic diaryl amine. More specifically, these amines can be described as compounds of the type having the structural formula

where the R's represent like or different aryl groups such as phenyl, naphthyl, anthryl, or phenanthryl radicals which may be either unsubstituted or substituted on their ring portions by groups such as amino, hydroxyl, mercapto, alkoxy, aryloxy, thioalkyl, aryl, alkaryl and aralkyl radicals. Representative amino compounds which can be successfully employed in a practice of the present invention include phenyl-α-naphthylamine, p-hydroxydiphenylamine, p,p'-di-hydroxy-di-phenylamine, diphenyl-p-phenylenediamine, diphenylamine, phenothiazine, di-β-naphthylamine, p-isopropoxydiphenylamine, di(p-isopropylphenyl)-p-phenylenediamine, di-β-naphthyl-p-phenylenediamine, p,p'diisooctyldiphenylamine, phenyl-α-anthrylamine and phenyl-α-phenanthylamine, etc. Other amines of this general variety are also well known in the art.

The polyhydroxy aromatic compounds which can be employed as primary inhibiting compounds are those in which at least two hydroxyl groups appear on one ring, for example hydroquinone, or on one aromatic nucleus, for example, 1,2-dihydroxy-naphthalene. Classes of these compounds are polyhydric phenols, naphthols, anthrols and the like, having a minimum solubility in the polyalkylene glycol polymeric materials of 0.25 per cent by weight of the polymeric materials and preferably 0.5 per cent. The specific class preferred is a dihydric phenol. Moreover, the polyhydroxy compound can have substituent groups on the aromatic ring or nucleus, such as amino, mercapto, alkoxy, aryloxy, thio, alkyl, aryl, alkaryl, and arylalkyl radicals, so long as there remain at least two free hydroxyl groups on at least one aromatic ring or nucleus, as aforesaid. However, substituent groups containing oxygen which are acidic or acid strengthening in nature, such as nitro, sulfonic acid, and carboxyl radicals which are not further oxidizable, are less desirable and for practical purposes are avoided. Examples of primary inhibiting polyhydroxy aromatic compounds are hydroquinone, t-butylhydroquinone, di-t-butylresorcinol, t-butylcatechol, 1,2-dihydroxynaphthalene, 1,4-dihydroxynaphthalene, 1,2-dihydroxy-4-phenylbenzene, 5-octyl, 1,4-dihydroxynaphthalene, 1,3-dihydroxy-5-cetoxybenzene, 1,2-dihydroxythianthrene, 1,2-dihydroxy-4-aminonaphthalene and 1,2-dihydroxy-4-isooctylaminobenzene.

The auxiliary inhibitor additives employed in conjunction with the above primary inhibitors are materials of the type having the formula

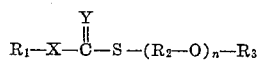

where $R_1$ is a hydrocarbon radical (preferably an alkyl radical), X is an oxy, thio, or imino (—$NR_4$—, $R_4$ being $H^+$ or alkyl) radical, Y is an oxo or thio radical, the $R_2$'s are 1,2-alkylene radicals, $R_3$ is a member selected from the group consisting of hydrogen atoms, alkyl radicals and acyl radicals, and n is an integer representing the number of 1,2-alkylene oxide monomer units present in the polymer. These compounds are of the type formed by polymerizing a 1,2-alkylene oxide with a salt of a suitable thiocarbonic acid compound or amide derivative thereof (i. e., a salt of a thiocarbamic acid) as the reaction initiator. A typical reaction of this variety is as follows:

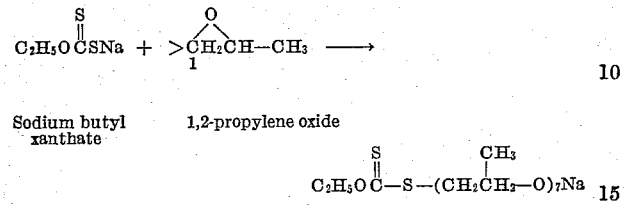

Sodium butyl xanthate     1,2-propylene oxide $$C_2H_5O\overset{\overset{S}{\|}}{C}-S-(CH_2\overset{CH_3}{\overset{|}{C}H}-O)_7Na$$

In the succeeding steps of neutralization with acid (usually acetic) and washing with water, the terminal —Na atom on the polymer molecule is replaced with H+, thereby providing the polymer with a terminal hydroxy group. This group can be left as such in the auxiliary anti-oxidant additives employed in this invention; on the other hand, by a practice of a conventional etherification or esterification reaction, this hydroxy group can be replaced by the desired alkoxy (ether) or acyl (ester) end group without impairing the utility of the polymer as an auxiliary anti-oxidant. Thus, the hydroxy group can be replaced by a methoxy, ethoxy, butoxy, 2-ethylhexoxy, phenoxy or other ether group, or by an acyl, propionyl, butyryl, or other acyl ester end group.

The reaction by which the auxiliary anti-oxidants are formed goes forward at elevated temperatures between about 80 and 200° C. and at pressures which preferably are from about 1 to 18 atmospheres. When using a sodium or other alkaline salt of the thiocarbonic acid derivative it normally becomes unnecessary to add a catalyst. However, where the reaction requires an added catalyst, there preferably is added an alkaline material such as caustic, sodium carbonate, ammonia, sodium methylate, sodium ethylate or the like. If desired, an inert solvent medium can be employed in which to conduct the desired polymerization reaction, an appropriate medium of this character being an alcohol-initiated polyoxyalkylene glycol of the type which comprises the major, or base portion of the present lubricant compositions. While the time, or duration of the reaction will vary as the temperature and other conditions of the reaction are changed, appreciable reaction takes place in periods as short as 1–3 hours, though, preferably reaction periods of 10 or more hours are employed in order to make the reaction as complete as possible.

In general, as evident from the foregoing descriptive portion, the process by which the present auxiliary anti-oxidants are formed is the same as that employed in forming poly-oxyalkylene glycols generally, the only difference lying in the selection of the particular reaction initiator. Suitable initiators, one or more of which can be employed in forming the present auxiliary anti-oxidants, are the following:

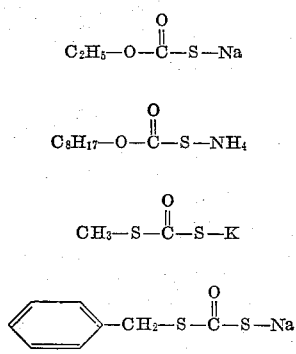

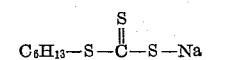

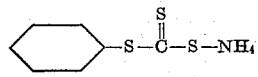

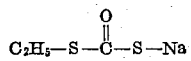

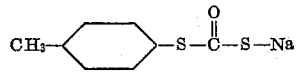

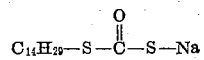

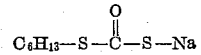

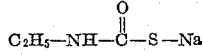

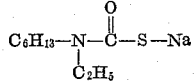

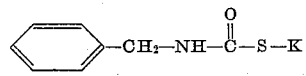

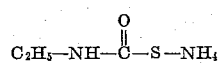

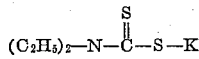

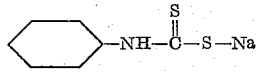

It is also possible to employ as the reaction initiator a beta-substituted alcohol such as

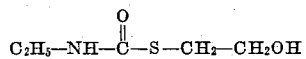

or

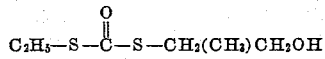

for example.

Here the hydroxy-substituted alkyl radical to which the thiocarbonic (or thio-carbamic) group is attached itself forms the terminal alkylene oxide group in the chain of such groups present in the polymer, as designated by $(R_2-O)_n$ in the general structural formula given above.

Since the auxiliary inhibitor additives employed herein are derived by employment of a suitable thiocarbonic acid compound or an amide derivative thereof, said additives are collectively referred to herein as thiocarbonyl-initiated polyoxyalkylene glycol materials. Said materials have molecular weights between about 180 and 3000, depending on the nature of the thiocarbonyl groups, and the number of carbon atoms in the respective $R_2$ and $R_3$ groups, and the value of $n$. Further, since these materials are normally obtained in the form of mixtures of varying internal structure and molecular weight, it falls within the purview of this invention to add such polymers either in the form of relatively pure compounds or in the form of a mixture of several such compounds. Accordingly, in referring herein to molecular weight, reference is had either to the molecular weight of a particular thiocarbonyl-initiated polymer or to the average molecular weight of a mixture of such polymers. The preferred thiocarbonyl-initiated polymeric additives comprise mixtures of polymers wherein, in the general structural formula given above, $R_1$ is an alkyl group of from 1 to 20 carbon atoms, X is —S— or —NH—, Y is =O or =S, the $R_2$'s represent ethylene or propylene groups, and $R_3$ is a hydrogen atom, an acyl group of a lower ($C_2$–$C_8$) fatty acid, or an alkyl group of from 1 to 20 carbon atoms, and wherein the polymer mixture has an average molecular weight between about 250 and 2000.

In general, the amount of the primary inhibiting additive required for the substantial inhibition of oxidative deterioration of polyoxyalkylene glycol polymeric material, when employed with a suitable amount of the thiocarbonyl-initiated auxiliary inhibitor, is from about 0.1 to 5% by weight of the finished oil, with a preferred range being from about 0.2 to 2%. The auxiliary inhibiting additive is added in an amount sufficient to provide the oil with from about 0.1 to 5% by weight sulfur (i. e., sulfur combined in the polyglycol molecule) and preferably from 0.25 to 2% by weight of such sulfur.

As indicated above, the polyoxyalkylene glycol base materials which comprise the major portion of the lubricant compositions of this invention are prepared by conventional methods. Thus, for example, polyoxypropylene, monohydroxy, monoether materials can be prepared by the addition of 1,2-propylene oxide to a monohydroxy aliphatic alcohol to produce a polymeric mixture of lubricating oil viscosity ranging in molecular weight from about 400 up to 2000 and higher. The preparation of mixed copolymeric polyalkylene oxide materials is also possible, as by reacting both ethylene oxide and 1,2-propylene oxide with a suitable monohydroxy aliphatic alcohol. Preferably employed as the base portion of the present lubricants are the diethers or ether-esters of polyglycols formed from ethylene oxide and/or from 1,2-propylene oxide.

The following examples are illustrative of the procedures which may be employed in forming the auxiliary, or thiocarbonyl-initiated polyoxyalkylene glycol inhibitors to be added to the conventional alcohol-initiated polyoxyalkylene glycol base fluids.

EXAMPLE I

In this operation 250 grams of sodium butyl xanthate in the form of a slurry in a methyl butyl diether of poly-1,2-oxypropylene glycol (average molecular weight 500) were placed in a suitable steel reactor vessel which was then connected to a source of 1,2-propylene oxide maintained under a constant pressure of 40 p. s. i. with nitrogen. The contents of the reactor vessel were then heated at 115° C. (and under the aforementioned pressure of 40 p. s. i.) for a reaction period of 20 hours, during which time 800 grams of the propylene oxide were introduced into the reaction mixture. The contents of the reactor vessel were then dissolved in ethyl ether, water-washed, and dried over anhydrous sodium sulfate. The product was then distilled in vacuo to remove the lighter fractions boiling below 180° C. (pot. temperature) at 4 mm. Hg. As bottoms from this topping operation there were recovered 218 grams of the desired product. It had a viscosity of 107.1 S. S. U. at 100° F. and of 38.5 S. S. U. at 210° F. This material was found to contain 7.51% sulfur and had an average molecular weight of approximately 900. The structure of this material is therefore essentially as follows:

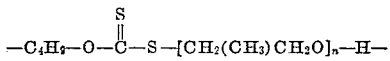

when $n$ has an average value of approximately 13.

EXAMPLE II

The procedure of Example I above was repeated, except that here there were employed 121 grams of beta (dibutyl thiocarbamyl) ethanol, 2 grams of a 50% dispersion of sodium in xylene, and 700 grams of propylene oxide, and the reaction period was extended to 30 hours. The resulting product was washed first with dilute acetic acid and then with a 10% aqueous solution of NaCl. After being dried over anhydrous $Na_2SO_4$, the product was topped to a pot. temperature of 210° C. at 4 mm. Hg. The residue (88 grams) contained 3.93% N and had a molecular weight of 380, a viscosity at 100° of 197 S. S. U. and at 210° F. of 42.8 S. S. U. This product, accordingly, had the following general formula:

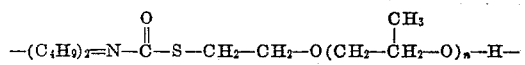

where $n$ has an average value of approximately 3.5.

EXAMPLE III

Any of the foregoing monothioether products can readily be converted to the corresponding (monothio) diethers or (monothio) ether-esters by conventional methods, as practiced, for example, in conjunction with the polyglycol materials employed as the base fluid in forming the oil compositions of this invention.

A convenient method of measuring the resistance to oxidation possessed by the compositions prepared in accordance with the invention is the use of the apparatus and procedure described in Industrial and Engineering Chemistry, vol. 28, p. 26 (1936), wherein the rate of oxygen absorbed at constant pressure by a definite weight of oil is regarded as a measure of the oxidative stability of the oil. According to this procedure, the oil sample is placed in an absorption cell, provided in the bottom with a fine fritted-glass filter to disperse the oxygen stream, circulating through the system at a constant rate, into fine bubbles. In obtaining the data hereinbelow appearing, the following modified apparatus and procedure were employed.

The oxidation or absorption cell is constructed of a large glass tube with the head portion having a connection for introducing oxygen, an annular space surrounding the upper end of the tube and a fitting for a removable high speed glass stirrer. The annular space contains potassium hydroxide pellets for the removal of water, carbon dioxide, volatile aldehydes, etc. The lower portion of the cell which contains the tested sample is immersed in an oil bath at a temperature of about 340° F. During the test, the oil sample is rapidly agitated by means of a high-speed stirrer and is kept under a pressure of about 1 atmosphere of pure oxygen, the volume of oxygen added being automatically recorded. The time in hours required for 100 grams of oil to absorb 1200 cc. of oxygen is called the "induction period" (I. P.), and represents the point at which the sample begins to absorb oxygen or oxidize.

The following tabulated data were obtained from a number of experiments performed in accordance with the test above described. In Table I a number of sulfur-containing auxiliary inhibiting compounds are exemplified in combination with one or the other of the primary inhibiting compounds phenyl-α-naphthylamine and ti-butyl-catechol, the latter compounds being employed in amounts of 0.25% and 1%, respectively. The designated auxiliary inhibiting compounds were used in such amounts as to supply the oil composition with the equivalent of 1% by weight sulfur. In all instances the polyalkylene glycol polymeric material was one prepared from 1,2-propylene oxide and 2-ethylhexanol, the said polymeric material having an average molecular weight of about 1200. The degree of oxidative stability of each combination appears as the induction period (I. P.) in hours at 340° F.

Table I

OXIDATION RESISTANCE OF INHIBITED POLY-1,2-OXYPROPYLENE GLYCOL 2-ETHYL-HEXYL MONOETHER

[Avg. mol. wt.—1200.]

| Example No. | Auxiliary Inhibitor (1% Sulfur) | Induction Period—Hours at 340° F. | | |
|---|---|---|---|---|
| | | Aux. Inhibitor Alone | Aux. Inhibitor (1% S) +0.25% Phenyl α Naphthylamine | Aux. Inhibitor (1% S) +1% Tert.-Butyl Catechol |
| III | None | 0.0 | 0.2 | 1.2 |
| IV | $C_4H_9OCSS(C_3H_7O)_{13}H$ (Example I) | 0.0 | 4. | 2.9 |
| V | $(C_4H_9)_2NCOSC_2H_5O(C_3H_7O)_{3.5}H$ (Example II) | 0.0 | 6.0 | 3.7 |
| VI | $C_{12}H_{25}SCOS(C_3H_7O)_7COCH_3$ | 0.0 | 4.5 | 3.3 |
| VII | $C_2H_5SCSS(C_3H_5O)_9H$ | 0.0 | 8.0 | 5.0 |
| VIII | $C_4H_9OCOS(C_3H_7O)_{7.5}C_2H_5$ | 0.0 | 2.6 | 2.4 |
| IX | $C_8H_{17}NHCOS(C_2H_5O)_3C_3H_7O)_4H$ | 0.0 | 3.0 | 3.0 |
| X | $(C_4H_9)_2NCSS(C_3H_7O)_{4.2}COC_2H_5$ | 0.0 | 6.5 | 3.5 |
| XI | 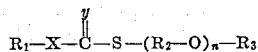—NHCOS $(C_3H_7O)_5H$ | 0.0 | 7.5 | 4.0 |
| XII | 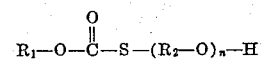—$CH_2OCSS(C_2H_5O)_6C_4H_9$ | 0.0 | 7.0 | 4.0 |

Compositions prepared in accordance with the present invention are useful as crankcase lubricants, hydraulic fluids, turbine oils, instrument oils, ice-machine oils, constituent oils in grease manufacture, and the like.

I claim:

1. A lubricant composition comprising a major portion of an aliphatic monohydric alcohol-initiated poly-1,2-oxyalkylene glycol of lubricating viscosity in which the alkylene groups are selected from the class consisting of ethylene and 1,2-propylene groups, together with from about 0.1 to 5% by weight of a primary inhibitor selected from the group consisting of phenyl-α-naphthylamine and tert.-butylcatechol and an amount sufficient to provide the lubricant composition with from about 0.25 to 2% by weight sulfur of a sulfur-containing polyoxyalkylene glycol having a molecular weight between about 180 and 3000 and having the general structure $$R_1-X-\overset{y}{\underset{\|}{C}}-S-(R_2-O)_n-R_3$$

wherein $R_1$ is an alkyl group of from 1 to 20 carbon atoms, X is a member selected from the group consisting of —S—, —NH— and —NR$_1$—, $y$ is a member selected from the group consisting of =O and =S, $R_2$ is an alkylene radical selected from the group consisting of ethylene and propylene radicals, $R_3$ is a hydrogen atom and $n$ is an integer designating the number of alkyleneoxide monomer units present.

2. A lubricant composition comprising a major portion of an aliphatic monohydric alcohol-initiated poly-1,2-oxyalkylene glycol of lubricating oil viscosity in which the alkylene groups are selected from the class consisting of ethylene and 1,2-propylene groups together with from about 0.1 to 5% by weight of a phenyl-α-naphthylamine primary inhibitor and an amount, sufficient to provide the lubricant composition with from about 0.25 to 2% by weight sulfur, of a sulfur-containing polyoxyethylene glycol having a molecular weight between about 180 and 3000 and having the general structure $$R_1-O-\overset{O}{\underset{\|}{C}}-S-(R_2-O)_n-H$$

where $R_1$ is an alkyl radical of from 1 to 20 carbon atoms, $R_2$ is an ethylene radical, and $n$ is an integer designating the number of ethyleneoxide monomer units present in the polymer.

3. A lubricant composition comprising a major portion of an aliphatic monohydric alcohol-initiated poly-1,2-oxyalkylene glycol of lubricating oil viscosity in which the alkylene groups are selected from the class consisting of ethylene and 1,2-propylene groups, together with from about 0.1 to 5% by weight of a phenyl-α-naphthylamine primary inhibitor and an amount, sufficient to provide the lubricant composition with from about 0.25 to 2% by weight sulfur, of a sulfur-containing polyoxyethylene glycol having a molecular weight between about 180 and 3000 and having the general structure $$R_1-O-\overset{S}{\underset{\|}{C}}-S-(R_2-O)_n-H$$

where $R_1$ is an alkyl radical of from 1 to 20 carbon atoms, $R_2$ is an ethylene radical, and $n$ is an integer designating the number of ethyleneoxide monomer units present in the polymer.

4. A lubricant composition comprising a major portion of an aliphatic monohydric alcohol-initiated poly-1,2-oxyalkylene glycol of lubricating oil viscosity in which the alkylene groups are selected from the class consisting of ethylene and 1,2-propylene groups, together with from about 0.1 to 5% by weight of a phenyl-α-naphthylamine primary inhibitor and an amount, sufficient to provide the lubricant composition with from about 0.25 to 2% by weight sulfur, of a sulfur-containing polyoxyethylene glycol having a molecular weight between about 180 and 3000 and having the general structure $$R_1-NH-\overset{S}{\underset{\|}{C}}-S-(R_2-O)_n-H$$

where $R_1$ is an alkyl radical of from 1 to 20 carbon atoms, $R_2$ is an ethylene radical, and $n$ is an integer designating the number of ethyleneoxide monomer units present in the polymer.

5. A lubricant composition comprising a major portion of an aliphatic monohydric alcohol-initiated poly-1,2-oxyalkylene glycol of lubricating oil viscosity in which the alkylene groups are selected from the class consisting of ethylene and 1,2-propylene groups, together with from about 0.1 to 5% by weight of a phenyl-α-naphthylamine primary inhibitor and an amount, sufficient to provide the lubricant composition with from about 0.25 to 2% by weight sulfur, of a sulfur-containing polyoxyethylene glycol having a molecular weight between about 180 and 3000 and having the general structure $$\begin{matrix} R_1 \\ \phantom{R_1}\diagdown \\ \phantom{R_1}\phantom{\diagdown}N-\overset{O}{\underset{\|}{C}}-S-(R_2-O)_n-H \\ \phantom{R_1}\diagup \\ R_1 \end{matrix}$$

where $R_1$'s are alkyl radicals of from 1 to 20 carbon atoms, $R_2$ is an ethylene radical, and $n$ is an integer designating the number of ethyleneoxide monomer units present in the polymer.

6. A lubricant composition comprising a major portion of an aliphatic monohydric alcohol-initiated poly-1,2-oxyalkylene glycol of lubricating oil viscosity in which the alkylene groups are selected from the class consisting of ethylene and 1,2-propylene groups, together with from about 0.1 to 5% by weight of a phenyl-α-naphthylamine primary inhibitor and an amount, sufficient to provide the lubricant composition with from about 0.25 to 2% by weight sulfur, of a sulfur-containing polyoxyethylene glycol having a molecular weight between about 180 and 3000 and having the general structure

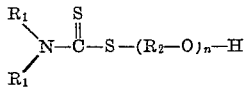

where $R_1$'s are alkyl radicals of from 1 to 20 carbon atoms, $R_2$ is an ethylene radical, and $n$ is an integer designating the number of ethyleneoxide monomer units present in the polymer.

7. A lubricant composition comprising a major portion of an aliphatic monohydric alcohol-initiated poly-1,2-oxyalkylene glycol of lubricating oil viscosity in which the alkylene groups are selected from the class consisting of ethylene and 1,2-propylene groups together with from about 0.1 to 5% by weight of a tert.-butylcatechol primary inhibitor, and an amount, sufficient to provide the lubricant composition with from about 0.25 to 2% by weight sulfur of a sulfur-containing polyoxyethylene glycol having a molecular weight between about 180 and 3000 and having the general structure

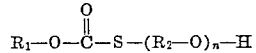

where $R_1$ is an alkyl radical of from 1 to 20 carbon atoms, $R_2$ is an ethylene radical, and $n$ is an integer designating the number of ethyleneoxide monomer units present in the polymer.

8. A lubricant composition comprising a major portion of an aliphatic monohydric alcohol-initiated poly-1,2-oxyalkylene glycol of lubricating oil viscosity in which the alkylene groups are selected from the class consisting of ethylene and 1,2-propylene groups, together with from about 0.1 to 5% by weight of a tert.-butylcatechol primary inhibitor, and an amount, sufficient to provide the lubricant composition with from about 0.25 to 2% by weight sulfur, of a sulfur-containing polyoxyethylene glycol having a molecular weight between about 180 and 3000 and having the general structure

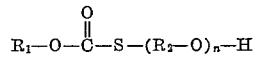

where $R_1$ is an alkyl radical of from 1 to 20 carbon atoms, $R_2$ is an ethylene radical, and $n$ is an integer designating the number of ethyleneoxide monomer units present in the polymer.

9. A lubricant composition comprising a major portion of an aliphatic monohydric alcohol-initiated poly-1,2-oxyalkylene glycol of lubricating oil viscosity in which the alkylene groups are selected from the class consisting of ethylene and 1,2-propylene groups, together with from about 0.1 to 5% by weight of a tert.-butylcatechol primary inhibitor, and an amount, sufficient to provide the lubricant composition with from about 0.25 to 2% by weight sulfur, of a sulfur-containing polyoxyethylene glycol having a molecular weight between about 180 and 3000 and having the general structure

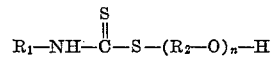

where $R_1$ is an alkyl radical of from 1 to 20 carbon atoms, $R_2$ is an ethylene radical, and $n$ is an integer designating the number of ethyleneoxide monomer units present in the polymer.

10. A lubricant composition comprising a major portion of an aliphatic monohydric alcohol-initiated poly-1,2-oxyalkylene glycol of lubricating oil viscosity in which the alkylene groups are selected from the class consisting of ethylene and 1,2-propylene groups, together with from about 0.1 to 5% by weight of a tert.-butylcatechol primary inhibitor, and an amount, sufficient to provide the lubricant composition with from about 0.25 to 2% by weight sulfur, of a sulfur-containing polyoxyethylene glycol having a molecular weight between about 180 and 3000 and having the general structure

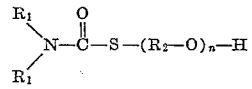

where $R_1$'s are alkyl radicals of from 1 to 20 carbon atoms, $R_2$ is an ethylene radical, and $n$ is an integer designating the number of ethyleneoxide monomer units present in the polymer.

11. A lubricant composition comprising a major portion of an aliphatic monohydric alcohol-initiated poly-1,2-oxyalkylene glycol of lubricating oil viscosity in which the alkylene groups are selected from the class consisting of ethylene and 1,2-propylene groups, together with from about 0.1 to 5% by weight of a tert.-butylcatechol primary inhibitor, and an amount, sufficient to provide the lubricant composition with from about 0.25 to 2% by weight sulfur, of a sulfur-containing polyoxyethylene glycol having a molecular weight between about 180 and 3000 and having the general structure

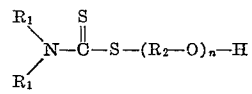

where $R_1$'s are alkyl radicals of from 1 to 20 carbon atoms, $R_2$ is an ethylene radical, and $n$ is an integer designating the number of ethyleneoxide monomer units present in the polymer.

References Cited in the file of this patent

UNITED STATES PATENTS 2,637,696  Kirshenbaum _____ May 5, 1953

FOREIGN PATENTS 601,419  Great Britain _____ May 5, 1949

OTHER REFERENCES

"Ind. and Eng. Chem.," vol. 45, No. 7, July 1953, page 1411.